US011993493B2

(12) United States Patent
Topp et al.

(10) Patent No.: US 11,993,493 B2
(45) Date of Patent: May 28, 2024

(54) BRAKE ASSEMBLY FOR SECURING A CONVEYOR DEVICE, CONVEYOR DEVICE AND CRANE SYSTEM

(71) Applicant: PINTSCH BUBENZER GMBH, Wehbach (DE)

(72) Inventors: Markus Ernst Topp, Nümbrecht (DE); Dirk Faust, Freudenberg (DE); Sebastian Wäschenbach, Freudenberg (DE)

(73) Assignee: PINTSCH BUBENZER GMBH, Kirchen-Wehbach (DE)

( * ) Notice: Subject to any disclaimer, the term of this patent is extended or adjusted under 35 U.S.C. 154(b) by 434 days.

(21) Appl. No.: 17/289,399

(22) PCT Filed: Oct. 4, 2019

(86) PCT No.: PCT/EP2019/076868
§ 371 (c)(1),
(2) Date: Apr. 28, 2021

(87) PCT Pub. No.: WO2020/088879
PCT Pub. Date: May 7, 2020

(65) Prior Publication Data

US 2021/0395052 A1 Dec. 23, 2021

(30) Foreign Application Priority Data

Oct. 29, 2018 (DE) ..................... 10 2018 126 964.1

(51) Int. Cl.
*B66C 15/00* (2006.01)
*B66C 13/16* (2006.01)
(Continued)

(52) U.S. Cl.
CPC .............. *B66C 15/00* (2013.01); *B66C 13/16* (2013.01); *B66C 13/30* (2013.01); *B66D 1/58* (2013.01); *B66D 5/28* (2013.01); *B66C 19/007* (2013.01)

(58) Field of Classification Search
CPC ......... B66C 15/00; B66C 13/16; B66C 13/04; B66C 13/12; B66C 13/30; B66C 1/101; B66C 19/007; B66D 1/58; B66D 5/28
See application file for complete search history.

(56) References Cited

U.S. PATENT DOCUMENTS

2010/0206831 A1* 8/2010 Faust ....................... B66D 1/58
212/278
2018/0273358 A1 9/2018 Kube

FOREIGN PATENT DOCUMENTS

CN 102493916 A 6/2012
CN 107 892 240 A 4/2018
(Continued)

OTHER PUBLICATIONS

Search Report for Chinese Patent Application No. 2019980081341.7, dated Mar. 25, 2023.
(Continued)

*Primary Examiner* — Emmanuel M Marcelo
(74) *Attorney, Agent, or Firm* — PEARL COHEN ZEDEK LATZER BARATZ LLP

(57) ABSTRACT

The invention relates to a brake assembly (1) for securing a conveyor device, in particular a crane system (100), comprising a first brake device (7) which acts on a first drive element (3), a second brake device (8) which acts on a second drive element (5), a transmission device (4), in particular a gearbox, acting between the first and second drive element, a load sensor (13, 13') which detects a load signal and passes same on to a controller (9), and the controller (9) is designed in such a way that, based on a load
(Continued)

signal that exceeds an overload threshold, it initiates an emergency brake status and actuates the first and the second brake device (7, 8) in such a way that they act on the first and second drive element (3, 5) simultaneously within a first brake acting time, wherein one of the first and second brake devices is designed such that it acts on the first and/or the second drive element within a second brake acting time in a normal brake status, and the first brake acting time is shorter than the second brake acting time.

12 Claims, 2 Drawing Sheets

(51) Int. Cl.

| | |
|---|---|
| ***B66C 13/30*** | (2006.01) |
| ***B66D 1/58*** | (2006.01) |
| ***B66D 5/28*** | (2006.01) |
| *B66C 19/00* | (2006.01) |

(56) References Cited

FOREIGN PATENT DOCUMENTS

| | | | | |
|---|---|---|---|---|
| CN | 107892240 | A | 4/2018 | |
| CN | 108180187 | A | 6/2018 | |
| CN | 108238561 | A | 7/2018 | |
| DE | 10 2013 200 514 | A1 | 7/2014 | |
| EP | 1 979 260 | A1 | 10/2008 | |
| JP | 2014526656 | A * | 10/2014 | ............. F16D 66/02 |
| WO | WO 2007/085293 | A1 | 8/2007 | |
| WO | WO 2014/111424 | A1 | 7/2014 | |

OTHER PUBLICATIONS

Search Report and Written Opinion for Singapore Patent Application No. 11202104303W, dated Oct. 3, 2022.
Search report for German Patent Application No. 10 2018 126 964.1, dated May 8, 2019.
International Search Report of PCT Application No. PCT/EP2019/076868, dated Jan. 16, 2020.

* cited by examiner

BRAKE ASSEMBLY FOR SECURING A CONVEYOR DEVICE, CONVEYOR DEVICE AND CRANE SYSTEM

CROSS-REFERENCE TO RELATED APPLICATIONS

This application is a National Phase Application of PCT International Application No. PCT/EP2019/076868, International Filing Date Oct. 4, 2019, claiming priority of German Patent Application No. 10 2018 126 964.1, filed Oct. 29, 2018, which is hereby incorporated by reference.

TECHNICAL FIELD

The present disclosure relates in general and in particular to a brake assembly for securing a conveyor device, in particular a crane system. It is provided for an overload event when a load exceeding the normal operating load, i.e. the overload, occurs while the conveyed goods are conveyed, i.e. when the conveyed goods are moved.

Overloads of this type can occur in particular in crane systems but also in elevators or other conveying systems if e.g. the conveyed goods get caught or are seized up during the conveying operation.

TECHNICAL BACKGROUND

In particular in the case of crane systems there is a risk that, when loads are moved upwards, they can get caught on objects or projections protruding into the conveying path. In such a case, loads can occur that can severely damage the conveyor device or, in the case of free-standing cranes, can even cause the conveyor device to fall over.

In a known overload protection system, such as that described in DE 202 19 282 U1, a load-dependent clutch separates a hoist cable winch from a hoist cable winch drive in the event of an overload. A likewise acting hoist cable brake here allows load-controlled lowering of the hoisting load after the clutch is separated.

A special problem exists with container crane systems, so-called "container gantry cranes", which, when handling containers, convey these containers out of the narrow cargo hatches of container ships. In the process, the containers can get jammed and seize up in these cargo hatches. If the conveying process continues, the resulting overload can cause the crane bridge to be severely overloaded and, in the worst case, even break off and fall.

Due to the sharply increasing handling speeds, such events can occur with both a loaded spreader and an unloaded spreader. In addition to the risk of damage to the crane bridge there is also the risk of damage to the spreader itself or to cargo hatches provided in the container ships if a so-called "snag" case occurs, in which the cargo or the spreader gets jammed or gets caught during a hoisting operation. Different approaches are known to handle such snag cases.

Traditional snag load systems detect the overload event and release the tension of the conveyor cables via hydraulically controlled load relief carriages so that the attached containers or the spreader can be brought out of the seized position and subsequently—after relieving a load—can be conveyed properly again. Such hydraulically controlled load relief devices are very costly and maintenance-intensive and require complex suspension cable guidance. This is particularly the case if, as is usual for container gantry cranes, two hoisting cable systems are provided for each container spreader and are synchronized during operation. In such systems, one such snag-load system is required for each hoisting cable system.

An improvement of this system is known from EP 1 979 260 B1. The open-loop and closed-loop control assembly disclosed herein includes a brake device acting on the conveyor device and on a controller for the brake device. Furthermore, an overload sensor is provided which detects an overload event and emits an overload signal when an overload clutch is triggered or the separation of the overload clutch is detected. As a result of the overload signal, the controller acts on the brake device in such a way that this brake device blocks the conveyor device and thus secures the conveyed goods.

In the context of the present disclosure, the term "conveyed goods" is intended to include both variable conveyed goods or cargo—i.e. e.g. a container—and an apparatus for receiving such cargo. An apparatus of this type can be, for example, a so-called "spreader" which can engage in corresponding corner fittings of a container at a plurality of corner points. Furthermore, the term "cargo" can also include an elevator car or the like.

The term "controller" shall hereinafter designate both a classical (open) open-loop control system, in which one or more input variables influence one or more output variables of a system, and also a (closed) closed-loop control system, in which the closed-loop control runs in a control loop and a controlled variable as a dependent variable is continuously compared with a predetermined variable and is automatically influenced for adjustment to this so-called "reference variable". The term "controller" shall hereinafter also refer to a system that performs both open-loop and closed-loop control functions or even simple digital actuation operations.

Another approach for detecting a so-called "snag" case is known from EP 2 313 336 B1. This document proceeds from the use of a measuring system in which force transducers or load sensors are provided on the handling cables or also on the locking pins, which comprise an electrical measuring system, e.g. strain gauges (DMS). As soon as the container or the spreader itself is hoisted, the measuring areas of the measuring pins deform and generate measurement signals that correspond to the load.

The greater the force acting on the measuring axes, the higher the measurement signal. For example, force signals can be processed or adjusted in such a way that, when a nominal load is exceeded, an emergency shutdown of the crane or an interruption of the hoisting process is caused. Such overload protection devices are also suitable to avoid or detect a so-called "snag load" condition.

Here, "snag load" is understood to mean the unintentional load increase of the crane, e.g. due to the load or the spreader getting caught in a ship to be unloaded or loaded, where the total load can increase symmetrically or also asymmetrically when the spreader or the container gets caught or jammed.

EP 2 313 336 B1 deals with the dynamic detection of such a malfunction (snag-load condition) in which the signal of a force sensor is monitored and a shutdown signal is emitted when exceeding a nominal overload threshold. Hoisting times with or without additional load are taken into account here, averaged weight forces are determined as the base load and dynamic jump thresholds are set as overload thresholds that are larger than the base load and smaller than a nominal overload threshold. This dynamic jump threshold is then used to generate a shutdown signal when the jump threshold is reached.

However, in all known snag-load detection systems there is, in addition to the problem of resuming normal operation, also the problem of braking the various drive elements in a suitable manner as fast as possible without overloading interacting elements of a drive chain and yet still being able to realize the fastest possible comprehensive braking function.

In container crane systems there is in particular the problem that multi-stage spur gear units are connected between relatively fast rotating drive motors (approx. 2000 revolutions per minute) and the relatively slow rotating cable drums (approx. 20 revolutions per minute) and, in order to achieve the best possible braking effect, brakes act on the drive shafts of the motors (at the gearbox input) and on the drive shafts of the cable drums or the cable drums themselves (at the gearbox output).

Therefore, the object is to provide an improved brake assembly that is capable of implementing the fastest possible emergency braking of the load even in the snag event and, at the same time, of actuating the braking components that act on different points of application of a drive chain in such a way that no overloads occur within the load transmission chain.

A further object can be considered that of providing a simple brake assembly that is suitable for both the snag case and normal service braking operations.

SUMMARY

According to a first aspect, the following disclosure provides a brake assembly which is used to secure a conveyor device, in particular a crane system. The brake assembly here comprises

- a first brake device which acts on a first drive element,
- a second brake device which acts on a second drive element,
- a transmission device, in particular a gearbox, acting between the first and second drive element, and
- a load sensor which detects a load signal and passes it on to a controller, and the controller is designed in such a way
- that, based on a load signal that exceeds an overload threshold, it initiates an emergency brake status and
- actuates the first and the second brake device in such a way that they act on the first and second drive element substantially at the same time within a first brake acting time, wherein one of the first and second brake devices is designed such
- that it acts on the first and/or the second drive element within a second brake acting time in a normal brake status, and
- the first brake acting time is shorter than the second brake acting time.

According to a second aspect, the present disclosure relates to a conveyor device having such a brake assembly.

And a third aspect relates to a crane system in which two corresponding conveyor devices are provided which are synchronized for moving a container spreader up and down, the two conveyor devices each having a brake assembly according to the first aspect, which can be actuated in a synchronized manner via a common controller.

Further aspects and features are apparent from the dependent claims, the accompanying drawing and the following description of embodiments.

BRIEF DESCRIPTION OF THE DRAWING

Embodiments will now be described by way of example and with reference to the accompanying drawing, in which.

DESCRIPTION OF EMBODIMENTS

Figure 1:
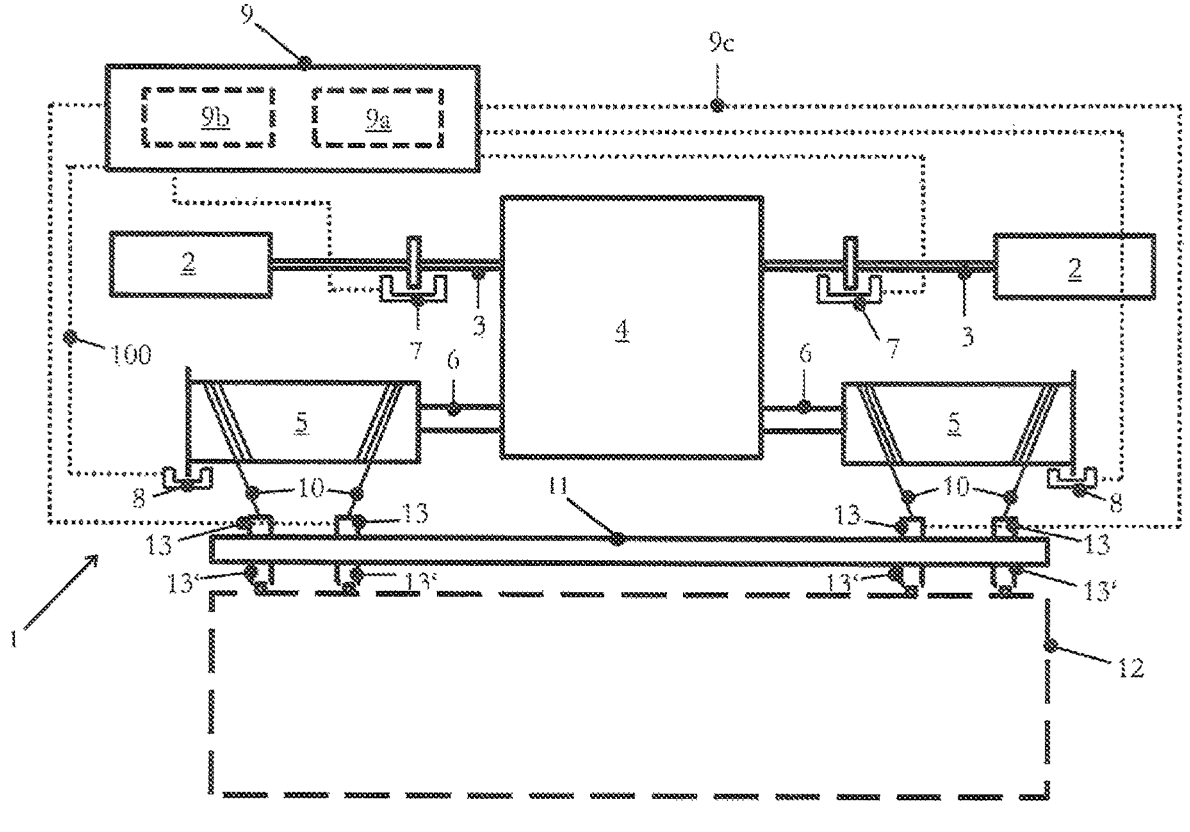
FIG. 1 shows a schematic diagram of an exemplary embodiment of a crane system with a brake assembly according to the invention.

General explanations on the embodiments are initially provided, followed by a detailed description of the embodiment with reference to FIG. 1.

The brake assembly according to the invention is characterized in that both an emergency brake status and a normal brake status can be represented with the same brake devices. This is made possible by the fact that in an emergency brake status at least one of two brake devices acts within a first (short) brake acting time on a first or a second drive element and in a normal brake status within a second (longer) brake acting time.

The shortened brake acting time represents a greatly increased load for the brake devices. In particular in the case of lever brakes, this places a very high load on the brake levers. In this way, it is possible to set the desired braking conditions with the same brake in both normal operation (regular operation with extended brake acting time) and an emergency (emergency operation with shortened load).

Typically, in an emergency brake status, both the first and the second brake device are actuated at the same time, so that the braking effect can be achieved substantially at the same time on the drive side and output side and a transmission device between the first and second drive element remains largely load-free.

This is in particular necessary in cases in which a relatively fast rotating electric drive motor is provided on the drive side, which drive motor drives e.g. a cable drum (second drive element) via a drive shaft (first drive element) and multi-stage reduction gearbox (transmission device) on the output side at a reduced rotational speed but increased torque.

In an emergency brake status, the drive shaft and the output shaft of the cable drum or the cable drum itself are then brought to a standstill almost simultaneously, so that the transmission device connected between them remains largely load-free in this case.

In a normal brake status, the second brake device is usually not used at all and the brake acting time on the first drive element is increased (the brake is applied more slowly) and thus the overall braking action is more gentle and less stressful on the individual elements.

There are embodiments in which the first brake device (e.g. acting on the drive shaft of a drive motor) comprises an electrohydraulic brake lifting apparatus in which a fluid pressure counteracting the brake force can be reduced in a piston by means of two valves which can be actuated electromagnetically, and the first brake acting time can be realized by de-energizing the two valves and the second brake acting time can be set by de-energizing one of the valves. By varying the flow cross-section in the valve in this way, the speed of the pressure reduction is also realized.

There are also embodiments where one valve is provided for the second brake acting time and two further valves are provided for realizing the first brake acting time—i.e. a total of three valves. In such an embodiment, increased functional redundancy can be achieved, which increases the safety of a corresponding brake assembly.

There are embodiments in which the second brake device can be actuated via a hydraulic unit and/or an electrohydraulic brake lifting apparatus, which comprises two redundant solenoid valves which can be electrically actuated and, by de-energizing one of the valves, a fluid pressure counteracting the brake force can be reduced and thus the braking effect on the second drive element can be triggered.

There are also embodiments in which two solenoid valves that can be actuated are provided in a single hydraulic unit for two second brake devices, which solenoid valves reduce the pressure in both second braking elements by de-energizing them.

In another embodiment, a separate electrohydraulic brake lifting apparatus is provided for each of the brake devices in the case of two second brake assemblies. Each brake lifting apparatus comprises two redundant solenoid valves that can be electrically actuated, wherein each of the solenoid valves reduces the fluid pressure counteracting the brake force by de-energizing so as to initiate a rapid braking effect on the second drive element or the second drive elements.

There are brake assemblies in which the actuation of both valves produces a brake acting time between 25 and 40 ms, and a second brake acting time of 180 to 250 ms can be realized by actuating only one valve at a time.

It is also possible for the first brake acting time at the first brake device to be slightly different from the first brake acting time at the second brake device. In particular, a first brake acting time on the first brake device can be shorter than the first brake acting time on the second brake device.

In a conveyor device designed as a cable hoisting system, a crane system or a component of a container crane system, the first brake device is usually provided on the fast-running drive shaft of the drive motor and the second brake device is provided on the drive shaft of a cable drum or on the cable drum itself, which runs with higher force but at a slower speed. Different first brake acting times or also emergency brake acting times on the components are here advantageous from a load point of view. For example, the fast-running motor drive shaft is first braked quickly and brought to a standstill, and the cable drum after a certain delay with a simultaneous or slightly delayed start of braking.

This also makes the emergency braking process gentle, in particular for an intermediate reduction gearbox since the gearbox on the input side is already almost at a standstill when the slow-running gearbox on the output side is brought to a standstill. This avoids overloading of the gear pairs in the gearbox. This is particularly important in a so-called "snag load" case, where emergency braking is provided when a load is hoisted.

There are embodiments in which the overload sensor is arranged on a load handling assembly that is coupled to the conveyor device. This can be, for example, a hook or a so-called "twistlock" on a container spreader by means of which the loads to be suspended are attached.

In the case of container spreaders, the load sensor can be arranged on a load handling element (twistlock) itself and/or also optionally in addition on a support cable connection. In this way, both overloads and in particular also asymmetrical snag-load conditions can be reliably detected on the loaded container spreader (with attached container) and on an unloaded container spreader, and different overload thresholds can be taken into account, which are usually higher on a loaded spreader than on an unloaded spreader.

The invention can be used in particular with conveyor devices that are designed as a cable hoisting system, as a crane system or as a component of a container crane system, and in particular in crane systems with two conveyor devices that are synchronized for moving a container spreader up and down. In this case, the two conveyor devices each have a brake assembly according to the invention, wherein these two brake assemblies can also be actuated in a synchronized manner via a common controller.

There are also embodiments in which, in the event of an overload, the synchronization of the conveyor devices can be cancelled and the controller acts on the brake device of one of the two or both conveyor devices as desired in response to a load relief signal. In this way, controlled lowering or raising of one side of the container spreader is also possible.

Returning to FIG. 1, this figure shows a crane system 100 with two brake assemblies 1 according to the invention. The crane system 100 comprises two drive motors 2, each of which acts via a first drive element designed as a drive shaft 3 and via a transmission device designed as a reduction gearbox 4 on a second drive element designed as a cable pulley 5. The cable pulley 5 is here coupled to the reduction gearbox 4 via an output shaft 6 and thus also to the drive shaft 3 and the drive motor 2.

In an alternative design, the output shaft 6 itself can also form the second drive element.

A first brake device 7 (service brake) acts on the drive shaft 3 and can exert a brake force on the drive shaft 3, for example, via a brake disk or brake drum connected to the drive shaft 3 for rotation therewith.

A second brake device 8 (safety brake) acts on the cable pulley 5 or on the output shaft 6 and can exert a brake force either via a brake disk formed on the cable pulley 5 or optionally via a brake drum or brake disk coupled to the output shaft 6 for rotation therewith. Both brake devices 7, 8 can be actuated via a controller 9. Both brakes are so-called industrial brakes in which the brake force is applied via a preloaded brake spring and the braking effect can be cancelled via an electrohydraulic actuator (brake lifting device) in that a hydraulic cylinder overcomes the spring force when pressure builds up and releases the brake either via a brake lever linkage or directly.

A so-called "container spreader" 11 is attached to the cable 10 of the cable drum and can accommodate a container 12. For the detection of load signals, load sensors 13 are provided which detect either the cable force or cable load and emit a corresponding signal to a controller 9. Alternatively or optionally in addition, load sensors 13' can also be provided which are provided on a load suspension element (e.g. a so-called "twistlock") which is used to pick up a load (e.g. a container). These load sensors 13' also detect the corresponding load and output a corresponding load signal to the controller 9.

The controller 9 comprises a crane controller 9*a* via which the normal operation of the crane system is controlled and via which, for example, the two drive motors 2 and the different brake devices 7 and 8 are synchronized.

Furthermore, the controller 9 comprises a safety controller 9*b*, which is provided for controlling an emergency brake status. In normal operation, the crane system is controlled via the drive motors 2 and the first brake devices 7, which are designed as service brakes. For this purpose, the drive motors 2 are accelerated and decelerated accordingly and, if necessary, an additional braking effect is applied via the service brakes 7.

The second brake devices 8 or safety brakes are usually not used during normal operation.

In this case, at least the brake devices 7 are designed in such a way that they can act on the drive shaft 3 within a first brake acting time and/or within a second brake acting time. The first brake acting time is here shorter than the second brake acting time. The first brake acting time is used for an emergency brake status, while the (longer) second brake acting time is used for a normal brake status. The second brake acting time causes a substantially lower load on the braking components of the first brake device 7 and the drive shaft 3.

The first brake acting time is substantially shorter and is used to stop the drive shaft 3 very quickly in an emergency brake status. Typical first brake acting times are between 25 and 40 ms, while second brake acting times are between 180 and 250 ms. In a normal brake status, the second brake device 8 is not normally used. However, in an emergency brake status, the second brake device or safety brake is also used to additionally stop the cable drum 5 itself and thus end the movement of the container spreader 11 as quickly as possible. For this purpose, the second brake device, i.e. the safety brake 8, also becomes effective within the shorter first brake acting time, so that both brakes 7 and 8 come to a standstill at approximately the same time.

However, it is possible that the first brake acting time at the second brake device is somewhat longer than the first brake acting time at the first brake device 7. Typical first brake acting times at the second brake device 8 (safety brake) are between 70 and 100 ms.

Figure 2:
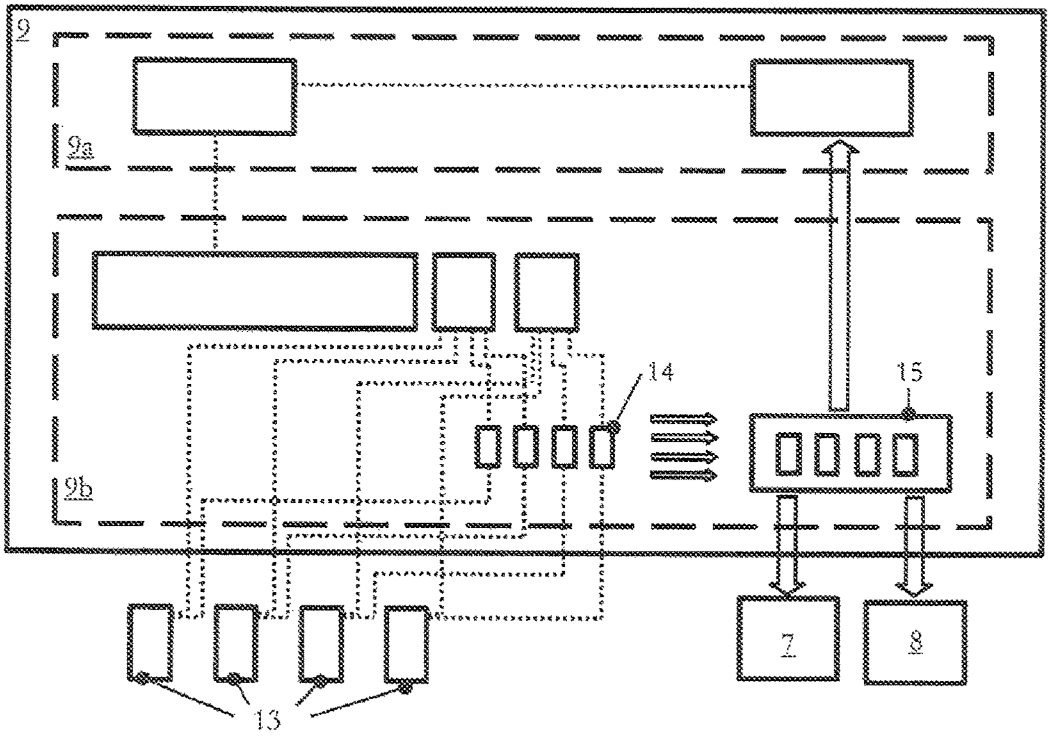
FIG. 2 shows a schematic diagram of a control system for actuating the brake assembly illustrated in FIG. 1.

The controller 9 is shown in FIG. 2. The crane controller 9*a* here controls the motors 2, the first brake devices 7 and the second brake devices 8 via corresponding signal lines 9*c*. The crane controller 9*a* can close each brake device 7, 8 at any time. In normal operation, however, it only controls the first brake devices 7 (service brakes).

The emergency brake controller 9*b* (also referred to as BOSS controller) is connected to the load sensors 13 and/or 13' and monitors and compares the two output channels of the load sensors 13 and/or 13'. In the event that the signals of the two output channels of the load sensors 13, 13' do not match, a defect of the load sensor is detected and an emergency brake status is triggered.

An emergency brake status is also triggered if a load signal exceeding an overload threshold is detected in one or more limit switches 14. In this case, the controller 9, 9*b* outputs corresponding signals to switching relays 15, which actuate the first and second brake devices (service and safety brakes) 7, 8 in such a way that they are each applied within the first (shorter) brake acting time (emergency braking state). Optionally, a further switching relay can be provided via which the crane controller 9*a* can also trigger an emergency brake status under certain circumstances.

Special electrohydraulic lifting devices 20, 30 are provided for triggering the different brake acting times. The function of these devices is explained with reference to FIGS. 3 and 4.

Figure 3:
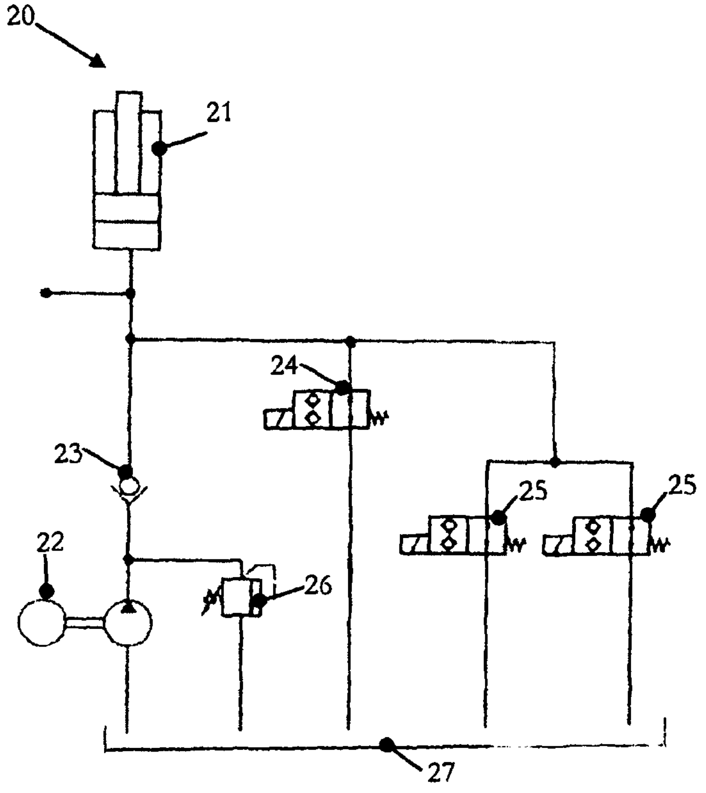
FIG. 3 shows a schematic diagram of the hydraulic functionality of a lifting apparatus for a first brake device.

A lever brake 7 is provided for the drive shaft 3, which is subjected to higher rotational speeds but lower forces and is equipped with the lifting device 20 shown in FIG. 3. The lifting device 20 comprises an actuating cylinder 21 which can be adjusted by means of an electrically driven hydraulic pump 22. A check valve 23 is here provided between the hydraulic pump 22 and the actuating cylinder 21. The valve 24 and/or valves 25, which are each actuated by the control unit 9, are used to reduce the pressure, as well as the motor of the hydraulic pump 22. The actuating cylinder 21 unlocks or lifts the brake against a spring force and remains in its lifting position when the valves 24 and 25 are closed.

For the normal brake status, the pressure is reduced via a valve 24. Here, the reset speed of the actuating cylinder 21 depends on the fluid cross-section of the valve 24. This second brake acting time for a normal brake status is usually 180 and 250 ms, during which the actuating cylinder 21 is pushed in by the spring or brake force acting on the brake lever linkage. The smaller the flow cross-section is designed, the longer is the brake acting time.

In an emergency brake status, both valves 25 are actuated, also via the controller 9. These valves provide an increased flow cross-section which shortens the retraction of the actuating cylinder 21 and thus the brake acting time, which is usually between 25 ms and 40 ms.

Additional safety aspects are taken into account if it is determined during normal operation that the actuating cylinder is not reset when the valve 24 is actuated (de-energized, switched off). Both valves 25 are then automatically actuated (de-energized, switched off) to trigger the braking effect. Optionally, a pressure relief valve 26 is provided which limits the pressure build-up by the hydraulic pump 22. The necessary hydraulic liquid is provided in a reservoir 27.

Figure 4:
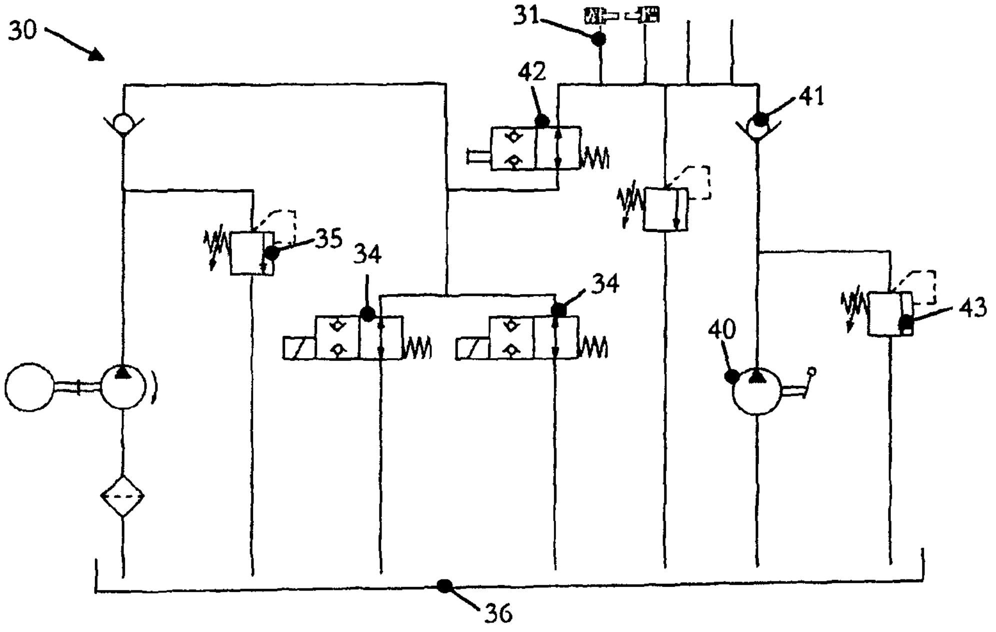
FIG. 4 shows a schematic diagram of the hydraulic functionality of a hydraulic unit for operating a second brake device.

FIG. 4 shows the lifting apparatus 30 for the second brake device 8, the safety brake. The lifting apparatus 30 has a design similar to that of the lifting apparatus 20, but does not comprise its own actuating cylinder. Instead, it acts via two output lines 31 on the brake cylinders 8*a* integrated in the second brake device 8 (safety brake). The pressure is also applied via a hydraulic pump 32, which is connected to the output connections 31 via a check valve 33. In the case of the valves 34, which can be electrically actuated and are designed to be open when de-energized, the pressure built up via the hydraulic pump 32 is maintained in a closed state (energized) and released in an open state (deenergized). The valves 34 are also actuated via the controller 9, 9*b*. A pressure relief valve 35 is also additionally provided here, if necessary, and limits the pressure built up via the hydraulic pump 32. The hydraulic liquid is also provided in a reservoir 36. Optionally, a measuring connection 37 and a pressure switch 38 can be provided, which can also be coupled to the controller 9.

In order to release the brake, the valves 34 are closed and the desired actuating pressure is built up via the hydraulic pump 32 and the brake cylinder is brought into its released (lifted) position. To release or apply the brake, the valves 34 are de-energized and the hydraulic fluid flows back into the reservoir 36 and the brake spring causes the actuating pistons to extend, which then engage a brake disk of the cable drums 5 or output shafts 6 via corresponding brake shoes. The valves 34 are of redundant design, so that even in the event of failure or jamming of one of the valves 34, the braking operation is carried out in any case via the second valve—even though with a slightly increased brake acting time.

Optionally, the lifting apparatus 30 can be provided with a manual lifting device in which a manually operated pump 40, which is coupled to the output connections 31 via a check valve 41, can build up a pressure. For this purpose, a valve 42 which can be manually actuated must be closed and two pressure relief valves prevent excessive pressure build-up upstream and downstream of the check valve 41. With this lifting apparatus 30, a brake acting time of 70 and 100 ms can be achieved in conjunction with a brake suitable for this purpose.

The interaction and targeted actuation of the brake lifting apparatuses 20 and 30 or the brake devices 7 and 8 also makes it possible to reliably implement emergency brake statuses without the need for additional components such as disconnect clutches or additional brakes. The system is also suitable for retrofitting existing crane systems.

Further variants and embodiments of the present invention will be apparent to a person skilled in the art within the scope of the claims.

LIST OF REFERENCE SIGNS

100 crane system
1 brake assembly
2 drive motor
3 drive shaft (first drive element)
4 reduction gearbox (transmission device)
5 cable pulley (second drive element)
6 output shaft (second drive element)
7 first brake device (operational brake)
8 second brake device (safety brake)
8*a* brake cylinder
9 controller
9*a* crane controller
9*b* emergency brake controller
9*c* signal line
10 cable
11 container spreader
12 container
13 load sensor
13' load sensor
14 limit switch
15 switching relay
20 lifting apparatus
21 actuating cylinder
22 hydraulic pump
23 check valve
24 valve
25 valve
26 pressure relief valve
27 reservoir
30 lifting apparatus
31 output connection
32 hydraulic pump
33 check valve
34 valve
35 pressure relief valve
36 reservoir
37 measuring connection
38 pressure switch
40 manually operated pump
41 check valve
42 hand valve
43 pressure relief valve

The invention claimed is:

1. A brake assembly for securing a conveyor device, comprising:

a first brake device, which acts on a first drive element,
a second brake device, which acts on a second drive element,
a transmission device, acting between the first and second drive element, and
a load sensor, which detects a load signal and passes it on to a controller,
wherein the controller is designed in such a way that, based on a load signal that exceeds an overload threshold, the controller initiates an emergency brake status and actuates the first and second brake devices in such a way that they act on the first and second drive elements simultaneously within a first brake acting time,
wherein one of the first and second brake devices is designed such that it acts on the first and/or the second drive element within a second brake acting time in a normal brake status, and the first brake acting time is shorter than the second brake acting time.

2. The brake assembly according to claim 1, wherein the first drive element is a drive shaft of a drive motor coupled to the transmission device.

3. The brake assembly according to claim 1, wherein the second drive element is a cable drum coupled to the transmission device via an output shaft.

4. The brake assembly according to claim 1, wherein the first brake device comprises an electrohydraulic brake lifting apparatus, wherein a fluid pressure counteracting the brake force can be reduced in a piston by means of two valves that can be electromagnetically actuated and the first brake acting time can be realized by de-energizing the two valves and the second brake acting time can be adjusted by de-energizing one of the valves.

5. The brake assembly according to claim 4, wherein, when the valve is switched off, the first brake acting time is 25 and 40 ms and, when the valves are switched off, the second brake acting time is 180 and 250 ms.

6. The brake assembly according to claim 1, wherein the second brake device can be actuated via a hydraulic unit and/or an electrohydraulic brake lifting apparatus which comprises two redundant magnetic valves that can be electrically actuated, and
wherein a fluid pressure counteracting the brake force can be reduced by de-energizing one of the magnetic valves, and
wherein the braking effect on the second drive element can be triggered in this way.

7. The brake assembly according to claim 1, wherein the overload sensor is arranged on a load handling assembly which is coupled to the conveyor device.

8. The brake assembly according to claim 7, wherein the load handling assembly is designed as a container spreader, and the load sensor is arranged on a load handling element and/or on a support cable connection.

9. A conveyor device comprising a brake assembly according to claim 1, wherein the conveyor device is designed as a rope hoisting system, as a crane system or as a component of a container crane system.

10. A crane system comprising two conveyor devices according to claim 9, which are synchronized for moving up and down a container spreader, wherein each of the two brake assemblies can be actuated in synchronized fashion by means of a common controller.

11. The crane system according to claim 10, wherein, in the event of an overload, the synchronization of the conveyor devices can be canceled and the controller alternatively acts on the brake device of one of the two or of both conveyor devices on the basis of a load relief signal.

12. The brake assembly according to claim 1, wherein the transmission device is a gearbox.

* * * * *